Dec. 23, 1930.  A. BUCLON  1,786,334
LUBRICATING APPARATUS FOR THE FLANGES OF WHEELS OF ENGINES
OR VEHICLES TRAVELING UPON RAILWAY TRACKS
Filed May 8, 1928   3 Sheets-Sheet 1
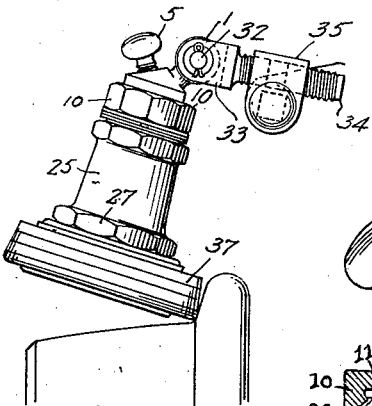
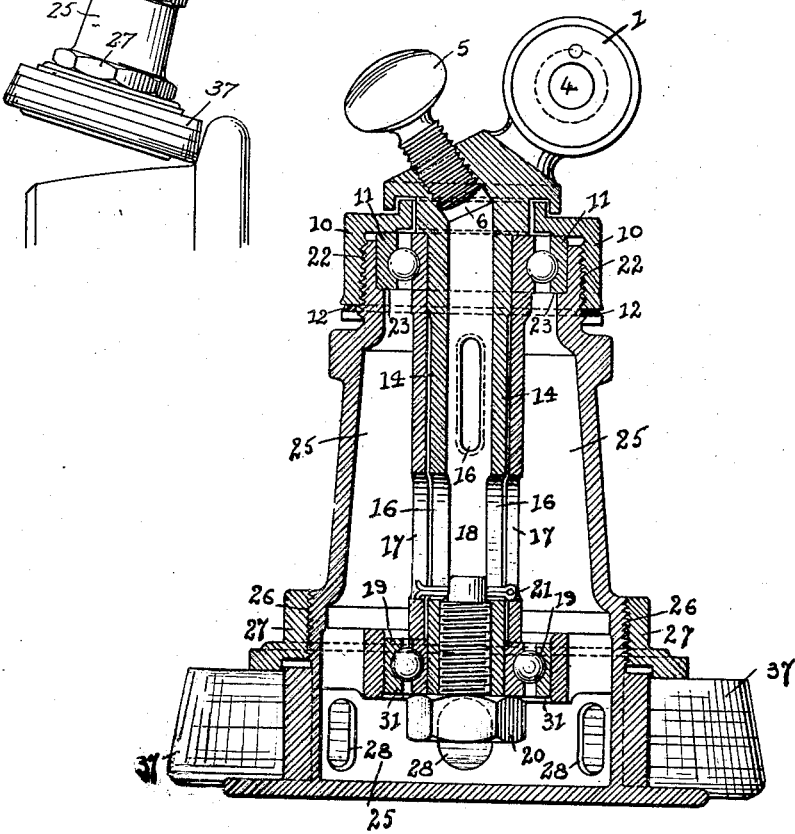
INVENTOR.
Achille Buclon.
By William C. Linton
Attorney.

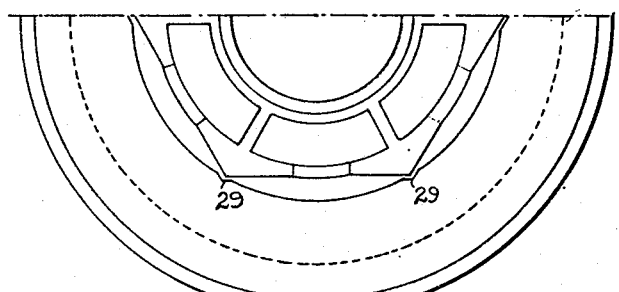
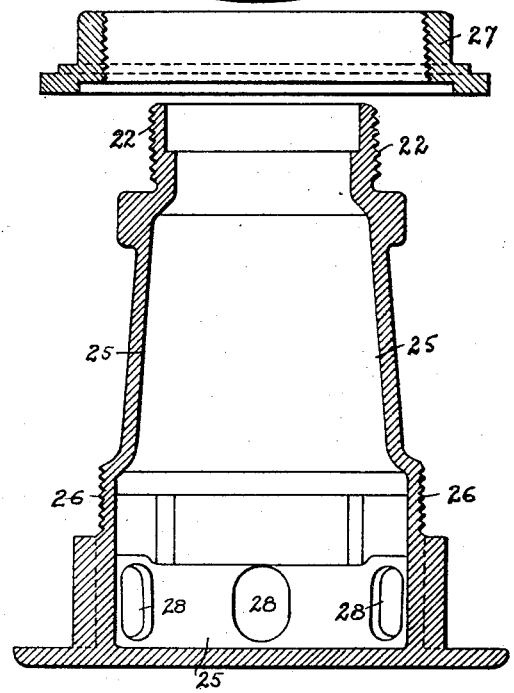

Dec. 23, 1930.  A. BUCLON  1,786,334
LUBRICATING APPARATUS FOR THE FLANGES OF WHEELS OF ENGINES
OR VEHICLES TRAVELING UPON RAILWAY TRACKS
Filed May 8, 1928   3 Sheets-Sheet 3
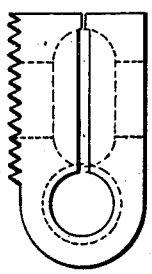
FIG_6
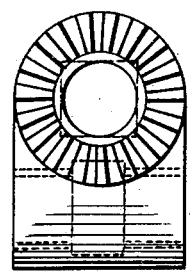
FIG_7
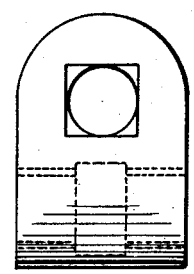
FIG_8
FIG_4
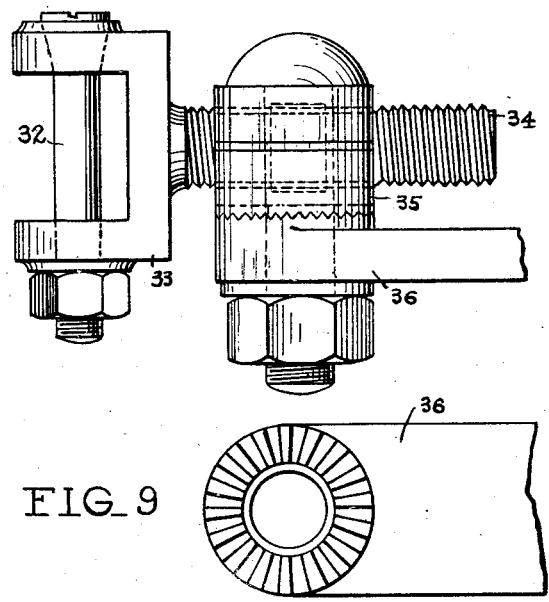
FIG_3
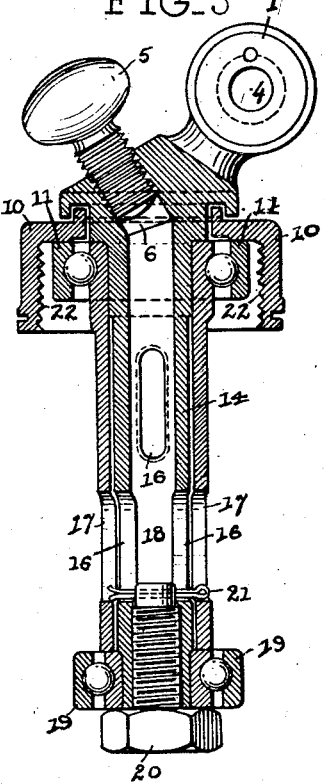
FIG_9
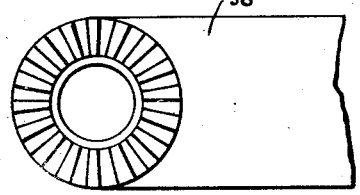
INVENTOR.
Achille Buclon
By William C. Linton
Attorney.

Patented Dec. 23, 1930

1,786,334

UNITED STATES PATENT OFFICE

ACHILLE BUCLON, OF ALES, FRANCE

LUBRICATING APPARATUS FOR THE FLANGES OF WHEELS OF ENGINES OR VEHICLES TRAVELING UPON RAILWAY TRACKS

Application filed May 8, 1928, Serial No. 276,132, and in France May 18, 1927.

My invention relates to a lubricating apparatus for the flanges of locomotives or vehicles traveling upon rails.

The said apparatus essentially comprises an element of suitable shape and size forming a recipient for oil which is hermetically closed, and is rotatable by means of ball bearings upon a central shaft bored axially on its whole length and provided with lateral orifices whereby the oil may enter the said recipient.

The upper end of the central shaft carries a plug of suitable shape which serves for filling purposes, and also a suitable attaching lug for the suspension of the apparatus, on which it may oscillate on a plane passing through the axle to be lubricated and perpendicularly to the axis of the boiler.

The lower end of the said oil tank is provided with lubricating discs which consist of a set of washers of a porous material whose combined thickness is practically equal to the height of the wheel flange to be lubricated, the same being maintained by a nut and a lock-nut disposed upon the body of the apparatus, which is rotatable on the said shaft.

I employ a supporting device comprising a rotula with striated faces combined with an adjustable and reversible forked bracket, in order to connect the apparatus with an element secured to the vehicle axle to be lubricated. The said oiling discs rotate with the wheel, and by centrifugal action, the oil will be driven from the interior of the tank to the exterior, and will pass through the felt discs, the lubrication depending directly upon the speed.

In the appended drawings, which are given by way of example:

Fig. 1 is a sectional view of the apparatus.

Figs. 2, 3, 4, 6, 7, 8, 9 and 10 are detail views.

Fig. 5 is a front view of the complete apparatus. 25 is the main body of the apparatus properly so called, which forms an oil tank and carries the recesses 23 and 31 adapted to receive the ball-bearings upon which it rotates. 22 is a screwthread coacting with the nut 10 of suitable shape which forms a cover for the said tank 25 and also serves as a piece for securing the said body 25 to the central shaft 14, which carries the lateral apertures 16 serving for the passage of the oil, and a central hole 18 by which it communicates at the top part with an aperture 6 closed by a screw plug 5 used for filling purposes. A device 12 serves to hold the nut 10 on the body 25. The upper end of the shaft 14 is terminated by a head 1 of suitable shape..., and is pierced with a hole 4 for the insertion of the axle 32 of the forked bracket provided with a rotula 33 secured to a member connected with the vehicle axle, by means of the threaded rod 34 which is adjustable by the members 35 and 36. A cross-piece 17 maintains the spacing between the two bearings 11 and 19, this latter being in contact at its lower part with a hexagonal headed screw 20 secured to the shaft 14 by the pin 21. The felt washers or discs for lubricating purposes 37 are superposed at the lower part of the body of the said tank 25, and they are held by the studs 29 and the nut 27 which is screwed on the threaded part 26 of the tank 25. The apertures 28 permit the oil to pass from the interior of the said tank into the said oiling discs. The oil may also flow from the central tank into the said discs by a flanged device of helical form by which the oil will be more strongly expelled to the exterior by centrifugal force.

The operation of the apparatus is as follows:

The apparatus which is mounted as herein specified, and is filled with oil, is secured to a point of the vehicle frame connected with the vehicle axle; it will take the position shown in Fig. 5 when the vehicle is in a straight line, and the oiling discs 37 will be in their position of least inclination, since the wheels are supposed to be in in their centre of lateral displacement.

When entering a curve on an inclined track, the locomotive will lean to the side of the small radius, which causes the oiling device on that side to take a position near the vertical; it may even be separated from the wheel flange, which has left contact with the rail head and does not require to be oiled at this time, but on the contrary, the position assumed by the oiling device situated next the large radius will be more inclined, and by its own weight it will press more strongly against the wheel flange which latter rubs more closely against the rail head and now requires the maximum oiling. At this time the apparatus will lubricate to its maximum degree. The feed is always proportional to the needs, for it depends only upon the speed of the wheels, and the apparatus operates automatically without the need of any accessory device which would require attention from the engine driver.

It is obvious that the said oiling apparatus may be variously constructed, and the details may be varied. For the several parts shown by way of example, I may substitute others of like nature or producing similar effects.

I claim:

1. An oiling device for flanges of wheels comprising a stationarily mounted shaft, an oil container supported by said shaft and rotatably mounted upon the same, and a ring of porous material carried by said container and capable of receiving the oil from the container, said ring of porous material being adapted to have frictional engagement with the flange of the wheel for rotating the oil container and thereby, through centrifugal force, forcing the oil through said ring of porous material.

2. An oiling device for flanges of wheels comprising a stationarily mounted shaft, an oil container supported by said shaft and rotatably mounted upon the same, said container being provided with a plurality of circumferentially disposed apertures, a ring of porous material carried by said container adjacent the apertures therein for receiving the oil from the container, said ring of porous material being adapted to have frictional engagement with the flange of the wheel for rotating the oil container and thereby, through centrifugal force, forcing the oil through said ring of porous material.

3. An oiling device for the flanges of wheels comprising a stationarily mounted shaft, an oil container supported by said shaft and rotatably mounted upon the same, said container being provided with a plurality of circumferentially disposed apertures, and a ring of fibrous material arranged about said container adjacent the apertures therein, and means carried by said container for clamping the ring of porous material thereon, said ring of porous material being adapted to have frictional engagement with the flange of the wheel for rotating the oil container and thereby, through centrifugal force, forcing the oil through said ring of porous material.

4. An oiling device for the flanges of wheels, comprising a stationarily mounted hollow shaft having ports formed therein and providing an oil admitting way, an oil container supported by said shaft and rotatably mounted upon the same, and a ring of porous material carried by said container and capable of receiving the oil from the container, said ring of porous material being adapted to have frictional engagement with the flange of a wheel for rotating the oil container and thereby, through centrifugal force, forcing the oil through said ring of porous material.

In witness whereof I have hereunto set my hand.

ACHILLE BUCLON.